United States Patent [19]

Moore, Jr. et al.

[11] 3,997,486
[45] Dec. 14, 1976

[54] PREPARATION OF POLYMERIC CHROMIUM COMPLEXES

[75] Inventors: Earl Phillip Moore, Jr., Hockessin, Del.; Fred Lee Bunger, North Ridgeville, Ohio

[73] Assignee: E. I. Du Pont de Nemours and Company, Wilmington, Del.

[22] Filed: Jan. 29, 1975

[21] Appl. No.: 545,143

Related U.S. Application Data

[63] Continuation-in-part of Ser. No. 421,595, Dec. 4, 1973, abandoned.

[52] U.S. Cl. .......................... 260/23 CP; 526/240;
   526/304; 526/310; 526/319; 526/332
[51] Int. Cl.² .................. C08L 91/00; C08L 33/02
[58] Field of Search .......... 260/80 L, 23 CP, 80 P; 450/716.5

[56] References Cited
UNITED STATES PATENTS

| | | | |
|---|---|---|---|
| 2,875,056 | 2/1959 | Smith et al. ........................ | 260/80 |
| 3,024,222 | 3/1962 | Freedman et al. .................. | 260/80 |
| 3,284,385 | 11/1966 | D'Alelio .............................. | 260/23 |
| 3,404,110 | 10/1968 | Hunt .................................... | 260/23 |
| 3,615,741 | 10/1971 | Gilchrist ............................. | 260/23 |
| 3,779,952 | 12/1973 | Leonard et al. ..................... | 260/80 |

FOREIGN PATENTS OR APPLICATIONS

862,490   3/1961   United Kingdom ................ 260/80

*Primary Examiner*—M. J. Welsh

[57] ABSTRACT

Homopolymers and copolymers are prepared which contain side chains of Werner complexes of carboxylic acid groups coordinated with chromium. Particularly useful are such polymers with side chains provided by the homopolymerization and copolymerization of methacrylato chromic chloride complexes. These materials have many uses including as coupling agents for bonding resins to other materials.

14 Claims, No Drawings

PREPARATION OF POLYMERIC CHROMIUM COMPLEXES

CROSS REFERENCE TO RELATED APPLICATION

This is a continuation-in-part of application Ser. No. 421,595, filed December 4, 1973, and assigned to the assignee of the present application, now abandoned.

BACKGROUND OF THE INVENTION

This invention relates to the preparation of polymeric chromium complexes. More particularly, it relates to the preparation of such complexes polymerized through carbon-to-carbon bonds rather than through olation.

Methacrylato chromic chloride and other related Werner complexes are well known for use as coupling agents between various polymers and other materials such as metals, oxides and glass. U.S. Pat. No. 2,544,666 — Goebel and Iler, one of many relating to such compositions, describes processes useful in making such complexes and is incorporated herein by reference. Dimers, trimers and polymers of such compositions are known to form through olation or oxolation by means of two or more chromium atoms being joined by oxygen bridges formed by hydroxyl groups or by oxygen atoms alone. Such olation or oxolation normally occurs after the complex has been adsorbed on the surface of a material. The chromium group is typically bonded to the substrate surface through an oxygen atom, and the various chromium groups can be bonded to each other through olation or oxolation, thereby forming a thin or monomolecular layer of complex on the surface. The opposite end of the complex, which may be a short or long chain carboxylic acid, gives desired characteristics to the surface such as hydrophilic or hydrophobic behavior or additional reactivity.

Although it is known to link such complex molecules on surfaces through olation or oxolation, similar materials are not generally available in which the carboxylic acid end of the complex molecule is a polymer to obtain characteristics of the polymers that can be formed.

It is known that organic polymers containing complexed chromium atoms can be prepared by reacting a basic chromium salt with an organic polymer containing carboxylic acid groups in a suitable solvent, as described in British Patent 862,490. However, working with preformed organic polymers, particularly those of high molecular weight, can be difficult, awkward or time consuming when dissolution is slow and solution viscosities are high. This can hinder the formation of the desired polymeric chromium complexes.

SUMMARY OF THE INVENTION

The present invention, in certain of its embodiments, provides a method for preparing an organic polymeric composition consisting essentially of monomeric units polymerized together, said polymeric composition being represented by the structural formula:

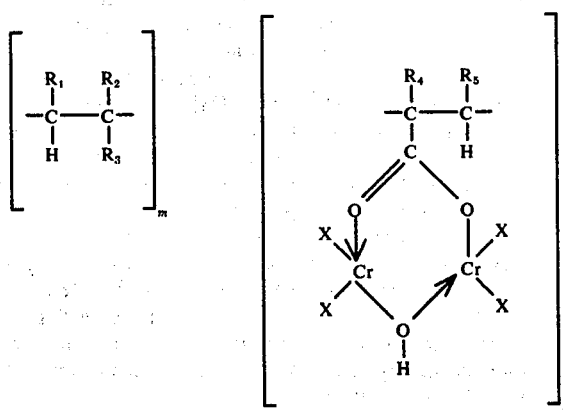

where
$R_1$ is hydrogen or an aliphatic hydrocarbon group of 1 to 6 carbon atoms or an aromatic hydrocarbon group of 6 to 12 carbon atoms;
$R_2$ is hydrogen, halogen, -CN, -CO$_2$R$_6$,

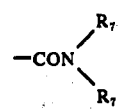

—OCOR$_7$, —OR$_7$, or —COR$_7$, where R$_6$ is hydrogen or a hydrocarbon group or a perfluoroalkyl group of 1 to 20 carbon atoms and R$_7$ is hydrogen or an aliphatic hydrocarbon group of 1 to 4 carbon atoms;
$R_3$ is hydrogen or methyl;
$R_4$ is hydrogen or a hydrocarbon group of 1 to 4 carbon atoms;
$R_5$ is hydrogen or a hydrocarbon group of 1 to 18 carbon atoms;
the sum of the carbon atoms of $R_4$ and $R_5$ is no more than 20;
the unit $n$ can contain 0, 1 or 2 double bonds;
X is Br$^-$, Cl$^-$, No$_3^-$, OH$^-$ or O$^{-2}$;
$m$ and $n$ are mole fractions, the total of which equals one, with $n$ being at least 0.01;
and said polymeric composition containing about, by weight, 1 to 35 percent chromium.

In one method of the invention, a carboxylic acid-chromium complex is copolymerized through unsaturated bonds with an organic monomer, using a free-radical initiator to commence the polymerization.

In another method of the invention, a chromium complex of an unsaturated carboxylic acid is homopolymerized through carbon-to-carbon bonds, using a free-radical initiator to commence the polymerization.

Particularly preferred embodiments of the invention include homopolymers of methacrylic acid chromium complexes; copolymers of methacrylic acid chromium complexes with methyl methacrylate, perfluorooctadecyl acrylate, vinyl chloride, and acrylamide; and copolymers of chromium complexes of acrylic acid and methacrylic acid, and linoleic acid and linolenic acid.

DETAILED DESCRIPTION OF THE INVENTION

The chrome complexes of organic polymers made according to this invention can be employed as surface modifying agents to accomplish a variety of useful purposes. The chromium portion of the complexes will bond to polar surfaces of materials such as glass, paper, cotton, nylon, polyacrylonitrile, rayon or polyesters. The bonds to the surface are formed by the condensation of Cr—OH groups with —OH groups on the surfaces of the substances. These Cr—O— bonds anchor the polymers to the substrates and orient them away from the substrates, thereby transforming polar surfaces into non-polar. The substrate surfaces treated with polymer-chromium complexes of this invention consequently exhibit properties generally associated with the polymers, except the chromium bonded polymers are much more resistant to solvent attack than the uncomplexed polymers. Olation and oxolation can further bond together two or more chromium complexes of the invention.

Specifically, the organic polymer-chromium complexes made according to this invention can be used as coupling agents to improve the bonding of resins to materials, release agents, lubricants, water and grease repellents, adhesives, wet-strength resins, coatings resistant to solvents, abrasion and heat, and coatings to improve printability, dyeability, and for other apparent purposes.

The organic portion of a polymer-chromium complex of this invention can be any of a large variety of polymer moieties which will coordinate with a trivalent chromium ion. The polymer moiety contains carboxylic acid functional groups to bond it to the chromium.

The basic chromium salt used to form the complexes should be a salt of a monobasic acid; that is, an acid having a single ionizable hydrogen. The acid may be an organic acid such as formic or acetic or it may be inorganic such as hydrochloric, nitric or hydrobromic. The chloride is the preferred counterion for chromium in the salt.

The basicity of the chromium salt should not be greater than 50 percent. The percentage of basicity of the salt may be defined as a measure of the extent to which hydroxyl groups have replaced the anions of the chromium salt. For example, chromium chloride hexahydrate, $CrCl_3.6H_2O$, is a chromium salt with chloride anions and has 0 percent basicity. When a hydroxyl group replaces one of the chloride ions a basic salt, $Cr(OH)Cl_2$, is formed, and since one-third of the chlorides has been replaced, the salt is said to be 33⅓ percent basic. Similarly, if two of the chloride ions were replaced the salt would be 66⅔ percent basic. In the preparation of the organic polymer-chromium complexes of this invention the basicity of the basic chromium salt used should not exceed 50 percent. However, basicity need not be high in order to form a complex compound; indeed, basicity may be only a fraction of one percent if desired.

A basic trivalent chromium salt of an acid useful in this invention may be prepared in a number of ways. A trivalent chromium salt such as chromium chloride hexahydrate, $CrCl_3.6H_2O$, may be heated to effect a rearrangement and dehydration of the salt to form a basic salt. The trivalent chromium salt may also be partially neutralized by adding a base such as sodium hydroxide. A particularly preferred method is to form the basic chromium salt by reducing a hexavalent chromium compound. Thus, chromyl chloride ($CrO_2Cl_2$) or chromic oxide ($CrO_3$) may be reduced with an agent such as an alcohol. The alcohol may also serve as a solvent for the reaction mixture.

The method of preparing the basic chromium salt by reducing a hexavalent chromium compound is especially useful, but certain precautions should be observed. Basic trivalent chromium salts have a marked tendency to coordinate with hydroxyl groups and, therefore, the molecules have a strong driving force toward interaction with each other to form compounds of higher molecular weight. Higher molecular weight basic chromium salts are insoluble or only sparingly soluble in water. To minimize such interaction it is desirable to use basic trivalent chromium salts within a reasonable time after preparation.

It is also desirable to have the unsaturated organic acid compound present only after the chromium is substantially in the trivalent state. Thus, in a preferred process the acid is added immediately after the reduction takes place.

The chromium complexes themselves are formed relatively easily. Usually they are formed by heating at reflux for a short time a mixture of the organic acid and the basic chromium salt in the desired proportions. Alternatively, the mixture can be allowed to stand at room temperature for several hours.

Homopolymerization and copolymerization processes according to the present invention permit much greater flexibility than reaction of chromium complexes with preformed polymers according to the prior art in that the final polymer is formed in solution and need not be dissolved, which could be difficult. Thus, solutions of more readily managed viscosities with the desirable polymer content and molecular weight can be obtained.

Free radical polymerization initiators which are used in this invention are well known in the polymer art. These include peroxide type compounds such as benzoyl and lauroyl peroxides, tertiary-butyl hydroperoxide, diisopropyl peroxycarbonate and the like and azo type compounds such as 2,2'-azobisisobutyronitrile and 2,2'-azobis(2,4-dimethylvaleronitrile). The amounts of free radical initiators useful in this invention will vary, depending upon the molecular weight and, therefore, the viscosity of polymer solution desired. Generally, 0.05 to 1.0% initiator will effect polymerization to give polymer solutions of a manageable, moderate viscosity with up to 20% polymer content. Initiator concentrations higher than 1.0% can be employed if desired and their effect will be to decrease polymer molecular weight and enable higher solids solutions to be produced. It is well to keep in mind, however, that decreased polymer molecular weight may entail sacrifice of physical properties.

Other means of regulating polymer chain length are known in the art, including the use of chain transfer agents and other chain length modifiers. These are thoroughly discussed in Flory, Principles of Polymer Chemistry, Cornell University Press, Ithaca, New York, 1953.

Appropriate solvent systems are important in this invention. The solvent or solvent mixture must act as solubilizer for all monomer compounds, including the unsaturated chromium complex, and the product of the polymerization, the polymer-chromium complex. It is further preferable that the solvent be water miscible so as to enable the polymer solution to be diluted with water without precipitating the polymer-chromium complex. The solvent for the polymerization may of course be water alone or it may be any of the lower molecular weight alcohols such as methanol, ethanol, propanol, isopropanol, tert-butyl alcohol, or it may be polyhydroxy compound such as ethylene glycol, propylene glycol, glycerol, diethylene glycol and the like, and other compounds are acceptable including acetonitrile, formamide, dimethylformamide, dimethylacetamide, dimethylsulfoxide, tetramethylurea, dioxane, tetrahydrofuran and diethyl ether. Each may be employed in mixtures with the others named and with water.

Hydrocarbon acids suitable for forming the products of this invention are the aliphatic unsaturated acids defined by the above formula and comprised of two to twenty-two carbon atoms containing in this carbon-to-carbon structure one, two or three double bonds ($>C=C<$). It will be understood that the term hydrocarbon acid includes substituted and unsubstituted straight chain, branched chain or cyclic unsaturated aliphatic carboxylic acids.

The unsaturated hydrocarbon acids to be coupled with chromium for use in the processes of this invention are well known to the polymer art and include acids such as:

acrylic and methacrylic
3-butenoic
7-octenoic
9-decenoic
11-dodecenoic
oleic
linoleic
linolenic
2-cyclopentene-1-acetic
tiglic
cinnamic
sorbic
crotonic
behenic The hydrocarbon acids as exemplified above can be formed into chromium complexes and as such homopolymerized to give the useful products of this invention, or the hydrocarbon acids as their chromium complexes can be combined with other compounds having carbon-to-carbon unsaturation ($>C=C<$), commonly referred to as comonomers, and the mixtures can be copolymerized to form highly useful products.

The hydrocarbon acid monomer complexed with chromium should be chosen so that the chromium will bond securely to the acid. Preferably, the hydrocarbon acid gives a polymer which will allow rotation of the chromium atoms so they can be oriented on the substrate surface. Hydrocarbon acids with about three carbon atoms between the site of unsaturation and the acid group appear to allow best product performance in some cases.

Examples of comonomers suitable for use in preparing the polymer-chromium complexes of this invention include the following:
ethylene
propylene
1-hexene
2-nonene
ethylene chloride
vinyl chloride
allyl chloride
methallyl bromide
styrene
methyl vinyl ether
acrylonitrile
methacrylonitrile
acrylamide
methacrylamide
vinyl acetate
vinyl pyridine
ethyl acrylate
methyl methacrylate
perfluoro octadecyl acrylate Good descriptions and examples of preparations of organic polymers by solution polymerization techniques which can be used to prepare the products of this invention can be found in "Preparative Methods of Polymer Chemistry" by Sorenson and Campbell, Interscience Publishers, New York, N.Y., 1961.

The methacrylato chromic chloride which is homopolymerized in accordance with a preferred embodiment of the invention is understood to have the following structure:

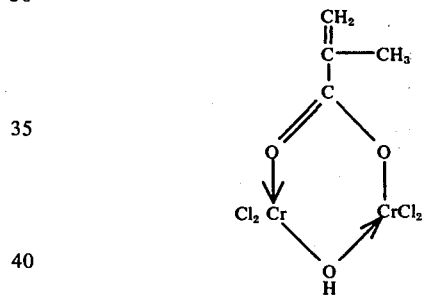

Relevant reaction conditions for preparing the products of this invention can be simply stated:

1. The temperature may be any appropriate temperature to effect polymerization of the unsaturated hydrocarbon acid chromium complex and, if used, comonomer. The temperature at which the free radical initiator is effective is important to the choice of polymerization temperature. It may be as low as 20° C. or as high as 130° C., but usually will be in the range of 50° to 90° C. for most of the initiators which can be employed in this process. It is preferable that an initiator be chosen so that it will effect polymerization at a temperature at or below the boiling point of the solvent so that pressure vessels do not have to be used.

As stated earlier, initiators suitable for use in this invention are plentiful and may be selected from a number of manufacturers' product lines.

2. The time of polymerization will also depend upon the activity of the free radical initiator. The more active an initiator is at a chosen reaction temperature, the faster the polymerization will be.

The rate of polymerization is, of course, temperature dependent with higher polymerization rates occurring at higher temperature.

Further, the proportion of initiator-to-monomer will determine how long it will take to effect polymerization. The higher the proportion, the sooner the polymerization will be completed. As indicated earlier, a method of controlling molecular weight is to carefully select the proper initiator-to-monomer ratio as is well known in the art. Generally, a reaction time of 1 to 4 hours will suffice, although longer or shorter times may be preferred or required, depending upon initiator-to-monomer proportion, temperature and initiator activity selections.

Art dealing with polymerization variables is numerous and covered thoroughly in many textbooks such as the Flory text cited earlier. Those skilled in the art will have no difficulty choosing times and temperatures to be used for various polymerization reactions within this invention.

The invention will be further illustrated by the following non-limiting examples. Proportions, parts and percentages herein are by weight unless otherwise specified.

EXAMPLE 1

Two hundred fifty grams of a 20% solution of a 1:2 molar complex of methacrylic acid and a basic chromium complex, $Cr(OH)Cl_2$, in isopropanol (analysis: 6.0% Cr, 5.0% methacrylic acid) is heated to reflux (80° C.). A solution of 14.6 mg. 2,2'-azobis(2,4-dimethylvaleronitrile) in 10 ml. acetone and 1 ml. 1-dodecanethiol is added and the mixture is refluxed for 75 min. to give a polymer solution with a maximum viscosity of 40.6 centipoises (cps). The polymer contains 30% Cr. The polymer solution is dilutable with water, methanol, ethanol or isopropanol. Glass slides dipped into a 2% aqueous solution of the product and heated at 100° C. for 5 min. to cure the coating are much more resistant to scratching than untreated glass slides.

EXAMPLE 2

The preparation of Example 1 is repeated with the exception that 56 mg. 2,2'-azobis(2,4-dimethylvaleronitrile) is used. The polymer solution has a maximum viscosity of 12.4 cps, indicating that a polymer of lower molecular weight is produced. The polymer solution is an excellent water-dilutable adhesive for joining fabric.

EXAMPLE 3

The preparation of Example 1 is repeated with the exception that 2 ml. 1-dodecanethiol is added. The polymer solution attains a maximum viscosity of 14.1 cps in 90 min. reflux, indicating that a polymer of lower molecular weight is formed. The product is used directly to apply a scratch resistant surface to window glass.

EXAMPLE 4

A solution of 14.5 g. (.145 m) methyl methacrylate in 236 g. isopropyl alcohol is heated to reflux. A solution consisting of 250 g. of the methacrylic acid-chromium complex of Example 1, 29.2 mg. of 2,2'-azobis(2,4-dimethylvaleronitrile) and 20 g. acetone is added to the refluxing methyl methacrylate solution over a period of 75 min. After 100 min., 7.3 mg. more 2,2'-azobis(2,4-dimethylvaleronitrile) in 5 ml. acetone is added and refluxing is continued for an additional 50 min. The 12.3% polymer in the solution contains 23.3% Cr. The mole fractions of polymer from methyl methacrylate and methacrylic acid-chromium complex are both 0.5.

Glass slides dipped in a 2% isopropyl alcohol solution of the product and dried for 5 min. at 100° C. exhibited increased ink retention when marked with a felt-tip ink pen, then placed in boiling water, compared to slides which were not treated.

EXAMPLE 5

In the manner described in Example 4, a polymer solution is prepared using 29.0 g. methyl methacrylate in 221 g. isopropyl alcohol and 250 g. methacrylic acid-chromium complex using 36.5 mg. lauroyl peroxide in 25 ml. acetone as initiator.

A 15.0% polymer-chromium complex solution is obtained with the mole fractions of polymer from methyl methacrylate and methacrylic acid-chromium complex of 0.67 and 0.33, respectively. The polymer contains 19.0% Cr.

The polymer forms an excellent protective coating for polished aluminum sheet when applied from diluted isopropanol solution.

EXAMPLE 6

In the manner described in Example 4, a polymer solution is prepared using 58.0 g. methyl methacrylate in 192 g. isopropyl alcohol and 250 g. methacrylic acid-chromium complex using 36.5 mg. tert-butyl peroctoate in 25 ml. acetone as initiator.

A 20.5% polymer-chromium complex solution is obtained with the mole fractions of polymer from methyl methacrylate and methacrylic acid-chromium complex of 0.80 and 0.20, respectively.

The polymer contains 13.9% Cr and forms a strongly adhering decorative glaze coating in stained, filled wood when applied from a water-ethanol mixture.

EXAMPLE 7

A terpolymer is prepared by polymerizing 57.7 g. ethylene, 18.4 g. vinyl acetate and 50 g. of the methacrylic acid-chromium complex of Example 1 in 850 ml. isopropyl alcohol at 85° C. in a pressure vessel using 1.0 g. 2,2'-azobis(isobutyronitrile). The polymer contains 10% Cr. The polymer solution contains 15% polymer.

Heat treated glass rovings are treated with the product of this example. The treated glass rovings are chopped and used to prepare a 30% glass-filled polyethylene. The organic polymer-chromium complex treated roving gives a glass-reinforced polyethylene with a flexural strength of 10,400 psi and a tensile strength of 7,800 psi. Untreated glass roving gives a glass-reinforced polyethylene with strengths of 8,100 and 5,700, respectively.

EXAMPLE 8

A polymer-chromium complex is prepared as in Example 1, except a mixture of 200 g. of an acrylic acid-chromium complex (1:2 mole acid:Cr) solution containing 6.0% Cr and 50 g. of a behenic acid-chromium complex (1:2 mole ratio acid:Cr) solution containing 3.0% Cr are copolymerized to give a polymer solution containing 5.4% Cr. The polymer gives a useful, tough, solvent resistant coating containing about 30% Cr.

EXAMPLE 9

A polymer-chromium complex is prepared as in Example 1, except 200 g. of a 75/25 mixture of linoleic/- linolenic acid-chromium complex (1:2 mole ratio acid:Cr) solution is polymerized to give a 6.0% polymer solution containing 1.2% Cr. The product is useful for preparing slow air-curing coating compositions.

EXAMPLE 10

A polymer-chromium complex is prepared as in Example 4 except 15 g. perfluorooctadecyl acrylate is used in place of methyl methacrylate. The 12.3% polymer solution contains 2.8% Cr and is useful as a water repellant composition for paper. The mole fractions of polymer from perfluorooctadecyl acrylate and methacrylic acid-chromium complex are 0.12 and 0.88, respectively.

EXAMPLE 11

A polymer-chromium complex is prepared as in Example 4, except 15 g. vinyl chloride is used in place of methyl methacrylate. The 12.3% polymer solution contains 2.8% Cr and is useful as an adhesive composition. The mole fractions of polymer from vinyl chloride and methacrylic acid-chromium complex are 0.62 and 0.38, respectively.

EXAMPLE 12

A polymer-chromium complex is prepared as in Example 4, except 15 g. acrylamide is used in place of methyl methacrylate. The 12.3% product contains 2.8% Cr and is useful as a strongly adherent coating for plastics which improves printability. The mole fraction of polymer containing acrylamide and methacrylic acid-chromium complex are 0.60 and 0.40, respectively.

What is claimed is:

1. A method for preparing an organic polymeric composition consisting essentially of monomeric units polymerized together, said polymeric composition being represented by the structural formula:

[structural formula]

where
R$_1$ is hydrogen or an aliphatic hydrocarbon group of 1 to 6 carbon atoms or an aromatic hydrocarbon group of 6 to 12 carbon atoms;

R$_2$ is hydrogen, halogen, —CN, —CO$_2$R$_6$, $$-CON\begin{matrix}R_7\\R_7\end{matrix},$$

—OCOR$_7$, —OR$_7$, or —COR$_7$, where R$_6$ is hydrogen or a hydrocarbon group or a perfluoroalkyl group of 1 to 20 carbon atoms and R$_7$ is hydrogen or an aliphatic hydrocarbon group of 1 to 4 carbon atoms;

R$_3$ is hydrogen or methyl;

R$_4$ is hydrogen or a hydrocarbon group of 1 to 4 carbon atoms;

R$_5$ is hydrogen or a hydrocarbon group of 1 to 18 carbon atoms;

the sum of the carbon atoms of R$_4$ and R$_5$ is no more than 20;

the unit $n$ can contain 0, 1 or 2 double bonds;

X is Br$^-$, Cl$^-$, No$_3^-$ or OH$^-$;

$m$ and $n$ are mole fractions, the total of which equals one, with $n$ being at least 0.01;

and said polymeric composition containing about, by weight, 1 to 35 percent chromium, wherein a carboxylic acid-chromium complex is copolymerized through unsaturated bonds with an organic monomer, using a free-radical initiator to commence such polymerization, said complex, monomer and polymeric composition being dissolved in a water-miscible solvent.

2. A method according to claim 1 wherein the composition is a homopolymerized methacrylic acid chromium complex.

3. A method for preparing an organic polymeric composition consisting essentially of monomeric units polymerized together, said polymeric composition being represented by the structural formula:

[structural formula]

where
R$_1$ is hydrogen or an aliphatic hydrocarbon group of 1 to 6 carbon atoms or an aromatic hydrocarbon group of 6 to 12 carbon atoms;

$R_2$ is hydrogen, halogen, -CN, -$CO_2R_6$,

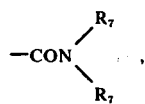

—$OCOR_7$, —$OR_7$, or —$COR_7$, where $R_6$ is hydrogen or a hydrocarbon group or a perfluoroalkyl group of 1 to 20 carbon atoms and $R_7$ is hydrogen or an aliphatic hydrocarbon group of 1 to 4 carbon atoms;

$R_3$ is hydrogen or methyl;

$R_4$ is hydrogen or a hydrocarbon group of 1 to 4 carbon atoms;

$R_5$ is hydrogen or a hydrocarbon group of 1 to 18 carbon atoms;

the sum of the carbon atoms of $R_4$ and $R_5$ is no more than 20;

the unit $n$ can contain 0, 1 or 2 double bonds;

X is $Br^-$, $Cl^-$, $No_3^-$, or $OH^-$;

$m$ and $n$ are mole fractions, the total of which equals one, with $n$ being at least 0.1;

and said polymeric composition containing about, by weight, 1 to 35 percent chromium, wherein a chromium complex of an unsaturated carboxylic acid is homopolymerized through carbon-to-carbon bonds using a free-radical initiator to commence the polymerization, said complex and polymeric composition being dissolved in a water-miscible solvent.

4. A method according to claim 3 wherein the composition is a copolymer of methyl methacrylate and a methacrylic acid chromium complex.

5. A method according to claim 3 wherein the composition is a copolymer of linoleic acid chromium complex and a linolenic acid chromium complex.

6. A method according to claim 3 wherein the composition is a copolymer of perfluorooctadecyl acrylate and a methacrylic acid chromium complex.

7. A method according to claim 3 wherein the composition is a copolymer of vinyl chloride and a methacrylic acid chromium complex.

8. A method according to claim 3 wherein the composition is a copolymer of acrylamide and a methacrylic acid chromium complex.

9. A method according to claim 1 wherein the polymerization is conducted in the temperature range of about 20° to 130° C.

10. A method according to claim 9 wherein the polymerization is conducted in the temperature range of about 50° to 90° C.

11. A method according to claim 10 wherein the polymerization is conducted for a time of about 1 to 4 hours.

12. A method according to claim 3 wherein the polymerization is conducted in the temperature range of about 20° to 130° C.

13. A method according to claim 12 wherein the polymerization is conducted in the temperature range of about 50° to 90° C.

14. A method according to claim 13 wherein the polymerization is conducted for a time of about 1 to 4 hours.

* * * * *